US012557823B2

(12) United States Patent
Aliaslkhiabani

(10) Patent No.: US 12,557,823 B2
(45) Date of Patent: Feb. 24, 2026

(54) DEHYDRATING APPARATUS AND METHOD

(71) Applicant: CANDRY TECHNOLOGIES INC., Coquitlam (CA)

(72) Inventor: Mahdieh Aliaslkhiabani, Burnaby (CA)

(73) Assignee: CANDRY TECHNOLOGIES INC., Coquitlam (CA)

( * ) Notice: Subject to any disclaimer, the term of this patent is extended or adjusted under 35 U.S.C. 154(b) by 708 days.

(21) Appl. No.: 17/904,757

(22) PCT Filed: Feb. 22, 2021

(86) PCT No.: PCT/CA2021/050206
§ 371 (c)(1),
(2) Date: Aug. 22, 2022

(87) PCT Pub. No.: WO2021/168550
PCT Pub. Date: Sep. 2, 2021

(65) Prior Publication Data
US 2023/0040871 A1 Feb. 9, 2023

Related U.S. Application Data

(60) Provisional application No. 62/980,948, filed on Feb. 24, 2020.

(51) Int. Cl.
| | |
|---|---|
| *A23B 2/97* | (2025.01) |
| *F26B 3/30* | (2006.01) |
(Continued)

(52) U.S. Cl.
CPC ................ *A23B 2/97* (2025.01); *F26B 3/305* (2013.01); *F26B 15/06* (2013.01); *F26B 21/02* (2013.01); *F26B 25/22* (2013.01)

(58) Field of Classification Search
CPC .......... F26B 3/305; F26B 15/06; F26B 21/02; F26B 25/72; A23B 2/97
(Continued)

(56) References Cited

U.S. PATENT DOCUMENTS

| | | | | |
|---|---|---|---|---|
| 3,264,747 A | * | 8/1966 | Fuentevilla | F26B 5/06 |
| | | | | 219/679 |
| 3,883,958 A | * | 5/1975 | Filipe | F26B 5/06 |
| | | | | 34/92 |

(Continued)

FOREIGN PATENT DOCUMENTS

| | | |
|---|---|---|
| CA | 1246861 A | 12/1988 |
| CN | 202304266 U | 7/2012 |

(Continued)

*Primary Examiner* — Stephen M Gravini
(74) *Attorney, Agent, or Firm* — D'Ambrosio & Menon, PLLC; Usha Menon

(57) ABSTRACT

A dehydrating apparatus suitable for dehydrating food and other biomass products comprises a dehydrating chamber, a vacuum assembly, a magnetron assembly, an infrared heating assembly, a heated air circulation assembly, and a controller. The magnetron assembly is electromagnetically coupled to the dehydrating chamber and is operable to transmit microwave energy into the dehydrating chamber. The vacuum assembly is fluidly coupled to the dehydrating chamber and is operable to reduce the air pressure within the dehydrating chamber. The infrared heating assembly is thermally coupled to the dehydrating chamber and is operable to radiate infrared energy into the dehydrating chamber. The heated air circulation assembly is fluidly coupled to the dehydrating chamber and is operable to circulate heated air within the dehydrating chamber. The controller is communicative with and programmed to operate the magnetron assembly, vacuum assembly, infrared heating assembly and heated air circulation assembly to first reduce pressure within the chamber, then simultaneously transmit micro- (Continued)

wave energy, radiate infrared energy, and circulate heated air inside the dehydrating chamber upon specific dried product drying procedure.

11 Claims, 7 Drawing Sheets

(51) Int. Cl.
| | |
|---|---|
| *F26B 15/06* | (2006.01) |
| *F26B 21/02* | (2006.01) |
| *F26B 25/22* | (2006.01) |

(58) Field of Classification Search
USPC .......................................................... 34/266
See application file for complete search history.

(56) References Cited

U.S. PATENT DOCUMENTS

| | | | |
|---|---|---|---|
| 5,675,909 A * | 10/1997 | Pare | B01D 19/0078 |
| | | | 34/305 |
| 5,859,412 A | 1/1999 | Yagi | |
| RE36,796 E * | 8/2000 | Sato | F26B 5/048 |
| | | | 34/92 |
| 6,233,841 B1 | 5/2001 | Beach | |
| 8,277,858 B2 | 10/2012 | Bows et al. | |
| 8,715,760 B2 | 5/2014 | Ashourian et al. | |
| 8,962,054 B2 | 2/2015 | Ashourian et al. | |
| 8,980,353 B2 | 3/2015 | Ashourian et al. | |
| 9,046,303 B2 * | 6/2015 | Yagi | F26B 5/06 |
| 9,155,133 B2 | 10/2015 | Wefers | |
| 9,221,027 B2 * | 12/2015 | Kuppler | B01J 10/005 |
| 9,273,902 B2 | 3/2016 | Trivette | |
| 9,510,605 B2 | 12/2016 | Melnyczuk | |
| 9,615,601 B2 | 4/2017 | Ashourian et al. | |
| 10,375,968 B2 | 8/2019 | Johnson et al. | |
| 10,465,985 B2 * | 11/2019 | Ganguly | F26B 3/28 |
| 11,160,891 B2 * | 11/2021 | Eades | F26B 3/347 |
| 11,384,980 B2 * | 7/2022 | Triglia, Jr. | F26B 13/008 |
| 11,732,964 B2 * | 8/2023 | Patel | F26B 25/063 |
| | | | 34/237 |
| 12,044,474 B1 * | 7/2024 | Troxler | F26B 3/347 |
| 12,085,337 B2 * | 9/2024 | MacKay | F26B 5/06 |
| 12,103,039 B2 * | 10/2024 | Efner | F26B 15/105 |
| 2004/0231184 A1 | 11/2004 | Wefers | |
| 2008/0138480 A1 | 6/2008 | Bows et al. | |
| 2010/0266734 A1 | 10/2010 | Bows et al. | |
| 2012/0164022 A1 | 6/2012 | Muginstein et al. | |
| 2015/0376833 A1 | 12/2015 | Papipati et al. | |
| 2023/0040871 A1 * | 2/2023 | Hamzehali | A23B 2/97 |

FOREIGN PATENT DOCUMENTS

| | | | | |
|---|---|---|---|---|
| CN | 103120287 B | | 1/2016 | |
| EP | 3303958 B1 * | | 10/2019 | F26B 3/28 |
| JP | 6718888 B2 * | | 7/2020 | A23B 2/92 |
| KR | 101664373 | | 10/2016 | |
| KR | 2023028341 A * | | 2/2023 | |
| WO | 2008113338 | | 9/2008 | |
| WO | 2016126843 | | 2/2016 | |
| WO | WO-2021168550 A1 * | | 9/2021 | A23B 2/97 |

* cited by examiner

DEHYDRATING APPARATUS AND METHOD

FIELD

This disclosure relates generally to a dehydrating apparatus and method, suitable to dehydrate wet products such as food and other biomasses.

BACKGROUND

Dehydration as a method to preserve food and other biomass products has been practiced since ancient times. Removing moisture impedes food from rotting by preventing microorganisms from reproducing. Dried foods also are lighter and have less volume, which is beneficial for transportation and storage.

Modern dehydration techniques employ machines that carry out a variety of dehydration methods, including one or a combination of vacuum, microwave and infrared drying. Vacuum drying involves reducing the pressure in a drying chamber to reduce the boiling set point inside a wet material so that evaporation occurs at a lower temperature. Microwave drying uses microwaves which penetrate the wet product and cause molecules inside the product to vibrate more quickly, generating heat inside the product and causing the water to evaporate. Infrared drying involves a heat transfer by radiation between a hot element and a wet product, and tends to heat the exterior and outer portions of the product.

Microwave and infrared heat energy are directly transferred from the microwave and infrared sources to the product to be heated without the need of an intermediate medium such as air or water. Consequently, the air inside the drying chamber is not directly heated, and water vapour tends to condense inside the machine. In other words, surface condensation on machine parts tends to occur as a by-product of the drying operation. Regularly removing such condensation is necessary to ensure effective operation of the machine and drying of the wet product. Typically, operators will manually wipe down the inside of the machines between operations. This tends to be tedious and time consuming, and reduces the efficiency of the drying operation.

It is therefore desirable to provide a solution to at least some of the existing challenges faced by prior art dehydrating machines.

SUMMARY

Figure 1:
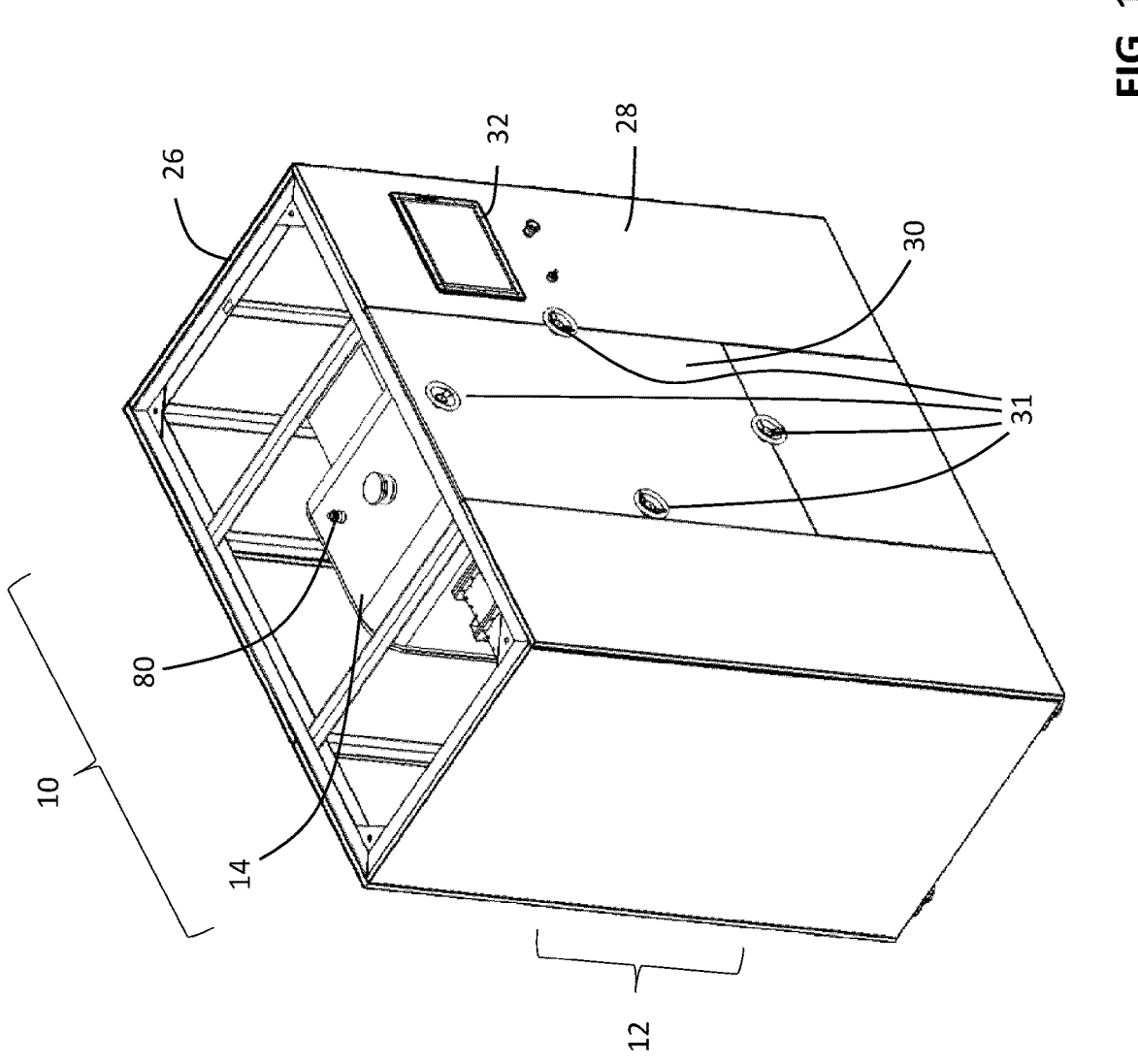
FIG. 1 is a top perspective view of a dehydrating apparatus according one embodiment of the invention.
Figure 2:
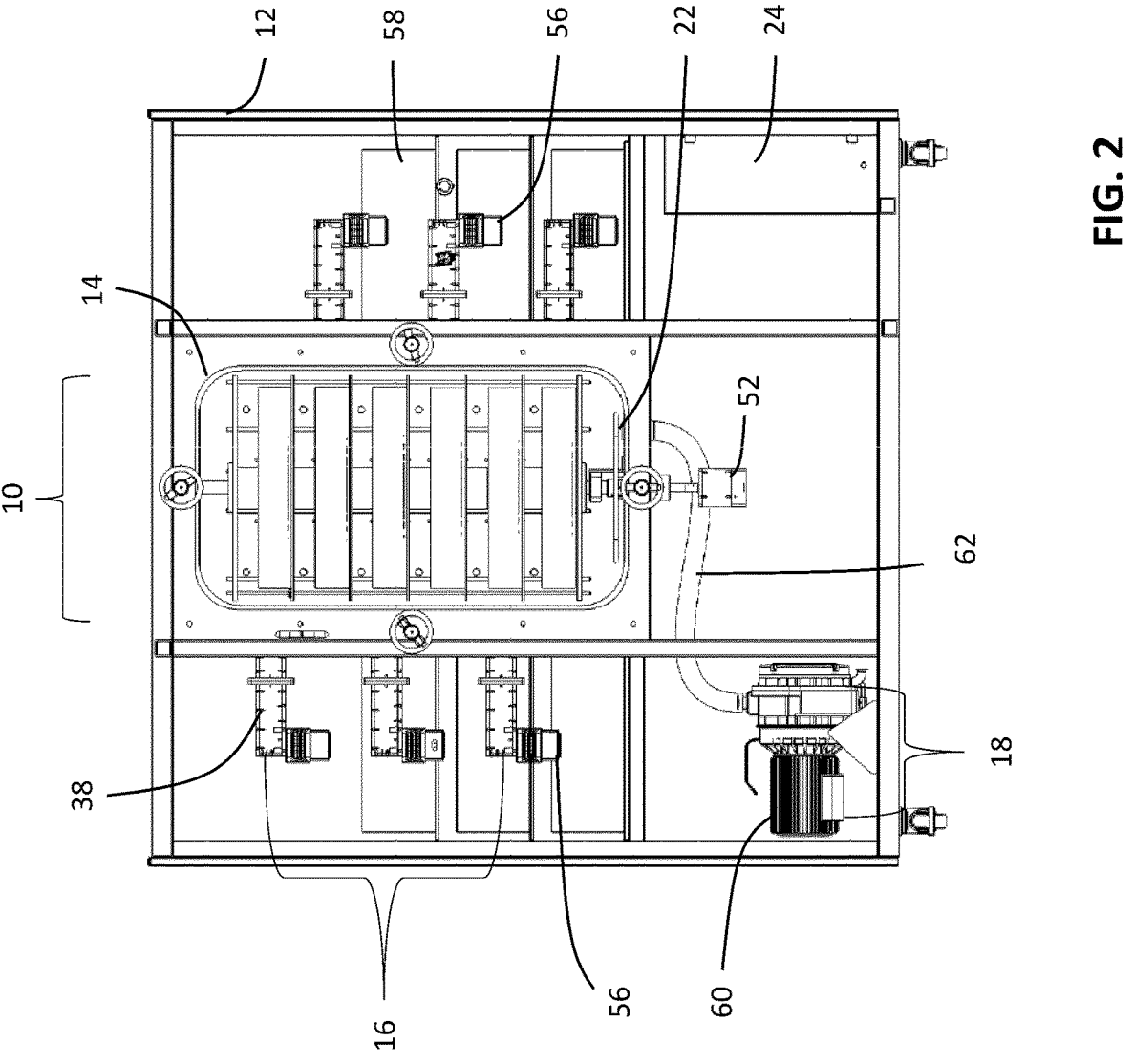
FIG. 2 is a front elevation view of the dehydrating apparatus shown in FIG. 1, with cover panels removed.
Figure 3:
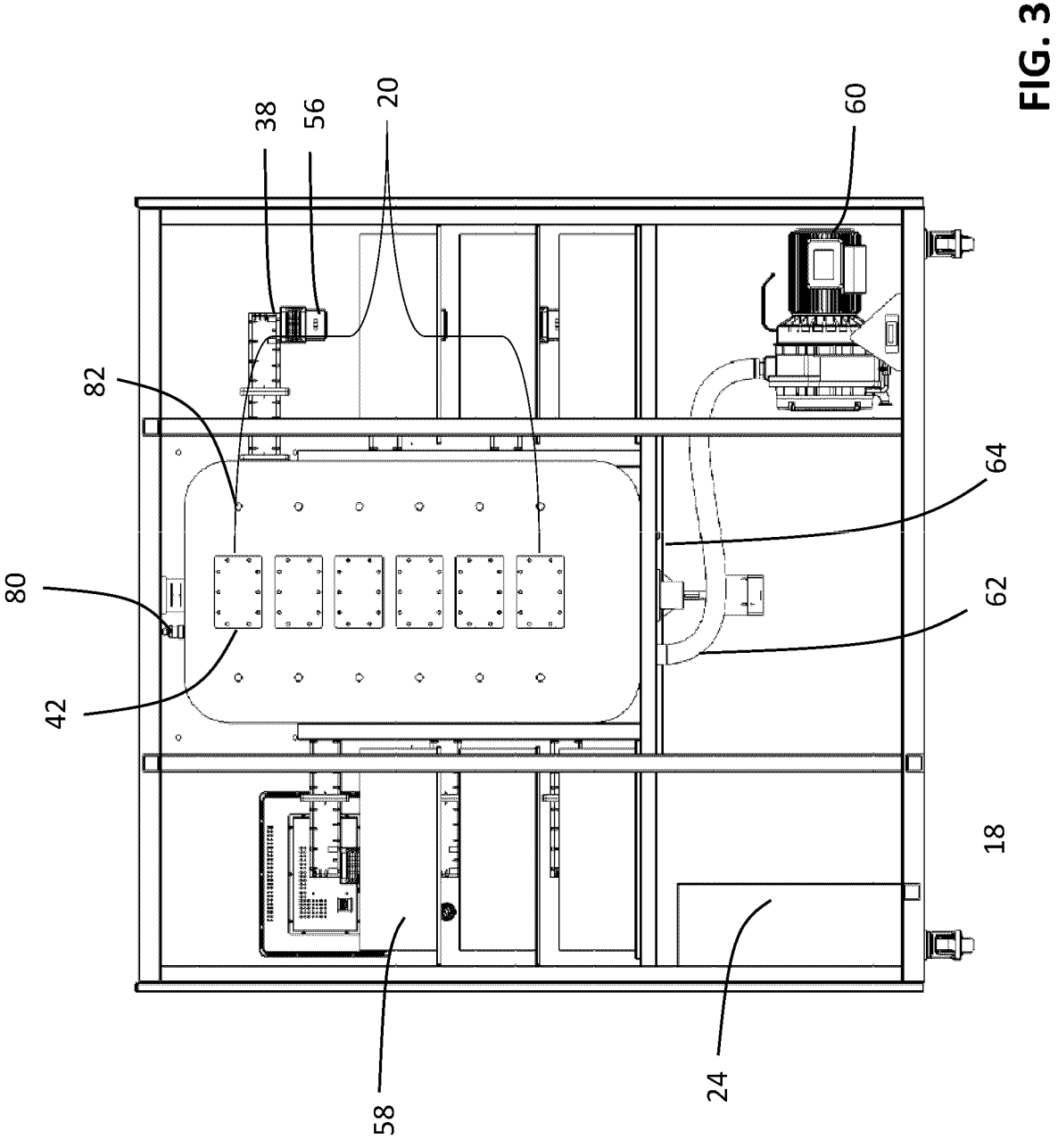
FIG. 3 is a rear elevation view of the dehydrating apparatus shown in FIG. 1, with cover panels removed.

According to one aspect of the invention, there is provided a biomass dehydrating apparatus comprising a dehydrating chamber for containing a biomass product to be dehydrated, a magnetron assembly, a vacuum assembly, an infrared heating assembly, a heated air circulation assembly, and a controller. The magnetron assembly is electromagnetically coupled to the dehydrating chamber and is operable to transmit microwave energy into the dehydrating chamber. The vacuum assembly is fluidly coupled to the dehydrating chamber and is operable to reduce the air pressure within the dehydrating chamber. The infrared heating assembly is thermally coupled to the dehydrating chamber and is operable to radiate infrared energy into the dehydrating chamber. The heated air circulation assembly is fluidly coupled to the dehydrating chamber and is operable to circulate heated air within the dehydrating chamber. The controller is communicative with and programmed to operate the magnetron assembly, vacuum assembly, infrared heating assembly and heated air circulation assembly to simultaneously reduce pressure, transmit microwave energy, radiate infrared energy, and circulate heated air inside the dehydrating chamber. The controller can select the power output of each of the magnetron assembly, infrared heating assembly, and heated air circulation assembly so that interior and exterior portions of the biomass product are evenly dehydrated.

The apparatus can further comprise a rotatable tray assembly inside the dehydrating chamber for rotatably supporting the biomass product. The rotatable tray assembly can comprise multiple vertically spaced plates, an axle connected to each plate, and a motor rotatably coupled to the axle such that the multiple plates can be rotated.

The heated air circulation assembly can comprise at least one heating element inside the dehydrating chamber, at least one heating pad contacting a wall of the dehydrating chamber, and at least one fan inside the dehydrating chamber. The controller can be programmed to operate the at least one heating pad to maintain the dehydrating wall at a selected temperature range, and to operate the heating element and fan to heat and circulate air within the dehydrating chamber. More particularly, the controller can be programmed to operate the at least one heating pad to maintain temperature of the dehydrating chamber wall between 36.7° C. and 41.2° C.

The vacuum assembly can comprise a vacuum pump, and the controller can be programmed to operate the vacuum pump to reduce the pressure inside the dehydrating chamber to 0.9-1.2 psi. The vacuum assembly can also comprise a pneumatic valve, and the controller can be programmed to operate the pneumatic valve to keep the pressure of the dehydrating chamber at a target set-point pressure.

The dehydrating chamber can comprise openings communicative with the magnetron assembly and infrared heating assembly such that microwave and infrared energy can pass into the dehydrating chamber. The magnetron assembly can comprise at least one magnetron and an associated waveguide extending between the at least one magnetron and one of the openings in the dehydrating chamber.

Temperature and pressure sensors can be coupled to the dehydrating chamber and be communicative with the controller. A user control interface can be provided that is communicative with the controller and is operable to manually control operation of one or more of the magnetron assembly, vacuum assembly, infrared heating assembly, and heated air circulation assembly.

According to another aspect of the invention, there is provided a method for dehydrating a biomass product, comprising: placing a biomass product to be dehydrated into a dehydrating chamber; reducing pressure inside the dehydrating chamber; then simultaneously: transmitting microwave energy into the dehydrating chamber; radiating thermal energy into the dehydrating chamber; and circulating heated air inside the dehydrating chamber. The power output of each of the transmitting microwave energy, radiating thermal energy and circulating heated air is selected such that the interior and exterior portions the biomass product are evenly dehydrated.

The method can further comprise one or more of: measuring the inner temperature of the biomass product and stopping transmission of the microwave energy when the measured inner temperature of the biomass product is within a target temperature range; measuring the outer temperature of the biomass product and stopping radiation of the thermal energy when the measured outer temperature of the biomass product is within a target temperature range; measuring the air temperature inside the dehydrating chamber and stopping circulation of the heated air when the measured air and dehydrating chamber's walls temperature is within a target temperature range; measuring the pressure inside the dehydrating chamber and stopping reduction of the pressure when the measured pressure is within a target pressure range; and measuring the moisture level of the biomass product, and stopping the dehydration method when the measured moisture level reaches a target set-point.

The method can further comprise preheating the dehydrating chamber prior to placing the biomass product inside the dehydrating chamber. The preheating can comprise circulating heated air inside the dehydrating chamber and its walls.

DETAILED DESCRIPTION OF EMBODIMENTS

Embodiments disclosed herein relate generally to a dehydrating apparatus and method for dehydrating a biomass product, wherein the biomass product is dehydrated in a pressure-reduced dehydration chamber by simultaneously transmitting microwave energy, radiating infrared thermal energy, and circulating heated air inside the dehydrating chamber. The transmitted microwave energy is expected to dry the inner portion of the biomass product, the radiated infrared thermal energy is expected to dry the surface and outer portion of the biomass product, and the circulated heated air is expected to also dry the surface and outer portion of the biomass product as well as remove or reduce moisture from the air and condensation inside the dehydrating chamber. The power output of each of the transmitting microwave energy, radiating infrared thermal energy and circulating heated air can be selected such that the outer and inner portions of the biomass product are evenly dehydrated. Since the inner and outer portions of the biomass product are dried simultaneously, the overall drying time is expected to be quicker than a method which heats the inner and outer portions sequentially, and in particular, is expected to be quicker than a drying method that relies solely on microwave energy to dehydrate the biomass product. Consequently, magnetrons used in embodiments of the dehydrating apparatus and method described herein are expected to have a longer life cycle than those used in dehydrating apparatuses which do not utilize radiating infrared energy and circulating heated air to dry the outer portions of biomass products. Additionally, the removal or reduction of condensation inside the dehydrating chamber by the circulating heated air is expected to contribute to faster and more uniform drying of the biomass product.

According to one embodiment and referring to FIGS. 1 to 6, a dehydrating apparatus 10 comprises an enclosure 12 enclosing a dehydrating chamber 14, a magnetron assembly 16, a vacuum assembly 18, an infrared heating assembly 20, a heated air circulation assembly 22 and a controller 24. The dehydrating apparatus 10 can be configured to dehydrate wet biomass products, and in particular, dehydrate food products.

As shown in FIG. 1, the enclosure 14 comprises a frame 26, exterior panels 28, and an access door 30 secured by knobs 31 which can be opened to access the inside of the dehydrating chamber 14. A user interface 32 comprising a touchscreen display is mounted on a front of the enclosure 12 and is electronically communicative with the controller 24, and operable to display information as well as receive user inputs concerning the operation of the dehydrating apparatus 10.

Figure 4:
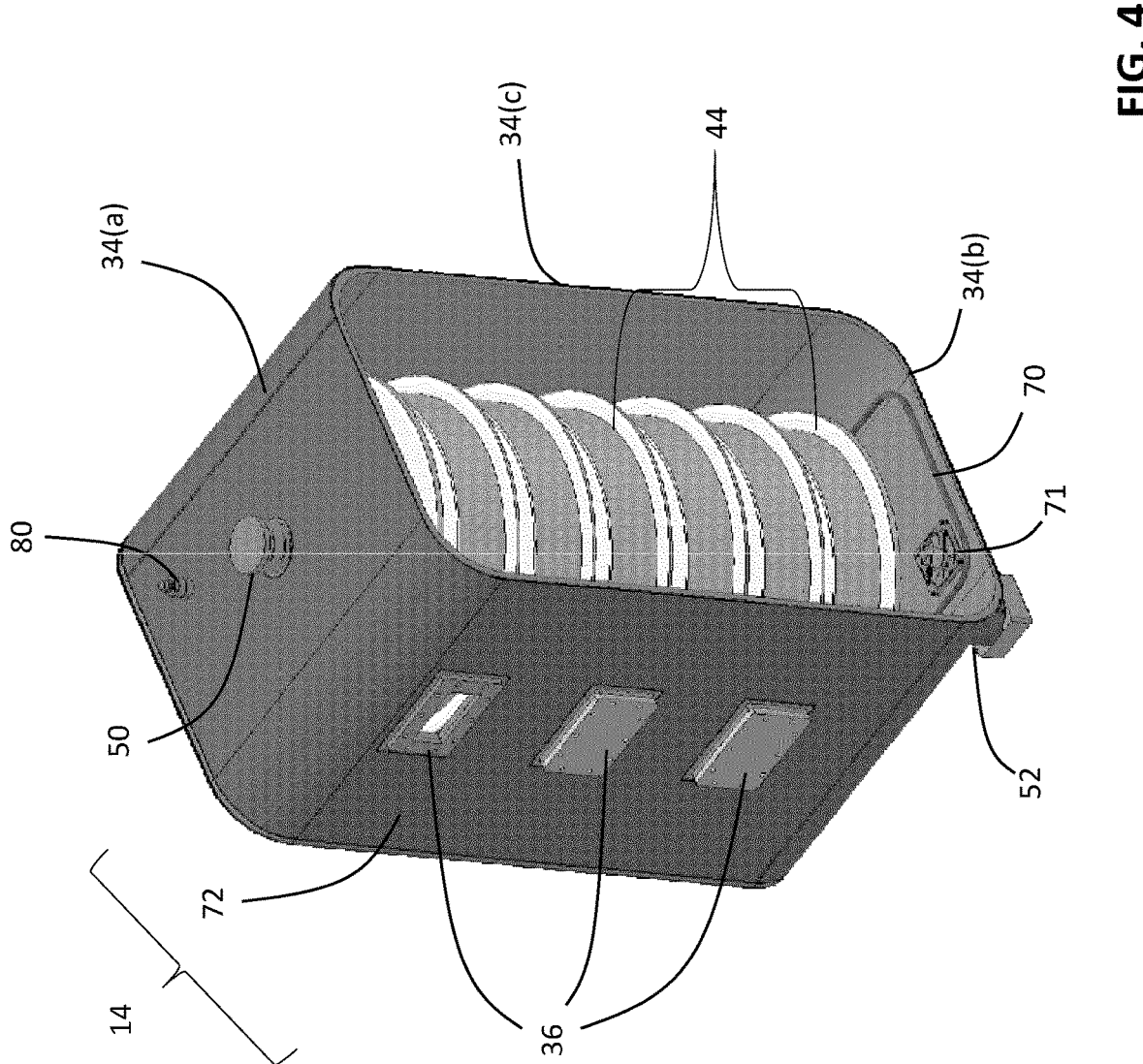
FIG. 4 is a top perspective view of a dehydrating chamber and rotating tray assembly of the dehydrating apparatus.
Figure 5:
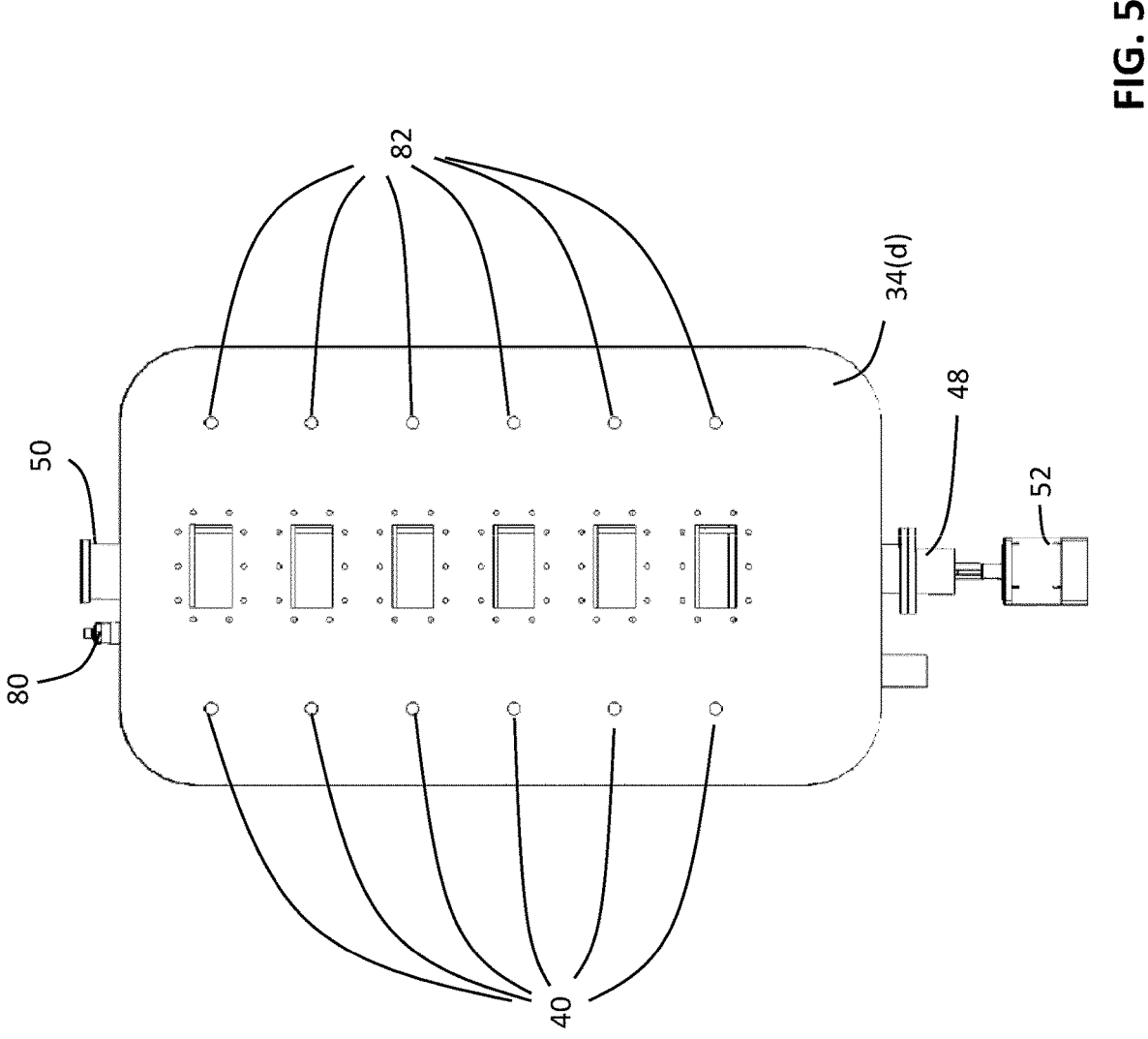
FIG. 5 is a rear elevation view of the dehydrating chamber and rotating tray assembly of the dehydrating apparatus.

As shown in FIGS. 4 and 5, the dehydrating chamber 14 comprises a top wall 34(a), bottom wall 34(b), a pair of side walls 34(c), and a back wall 34(d) that together define a housing having a front opening; a door (not shown) covers the front opening and can seal the dehydrating chamber 14. The side walls 34(c) each comprise multiple openings 36 each communicative with a waveguide 38 of the magnetron assembly 16 (see FIGS. 2 and 3). The back wall 34(d) comprises multiple openings 40 each communicative with an infrared heater 42 of the infrared heating assembly 20. A suitable material for the dehydrating chamber walls 34(a), 34(b), 34(c) and 34(d) is food-grade stainless steel, in which case the walls 34(a), 34(b), 34(c), 34(d) should be at least 8 mm thick to resist bending under vacuum.

Figure 6:
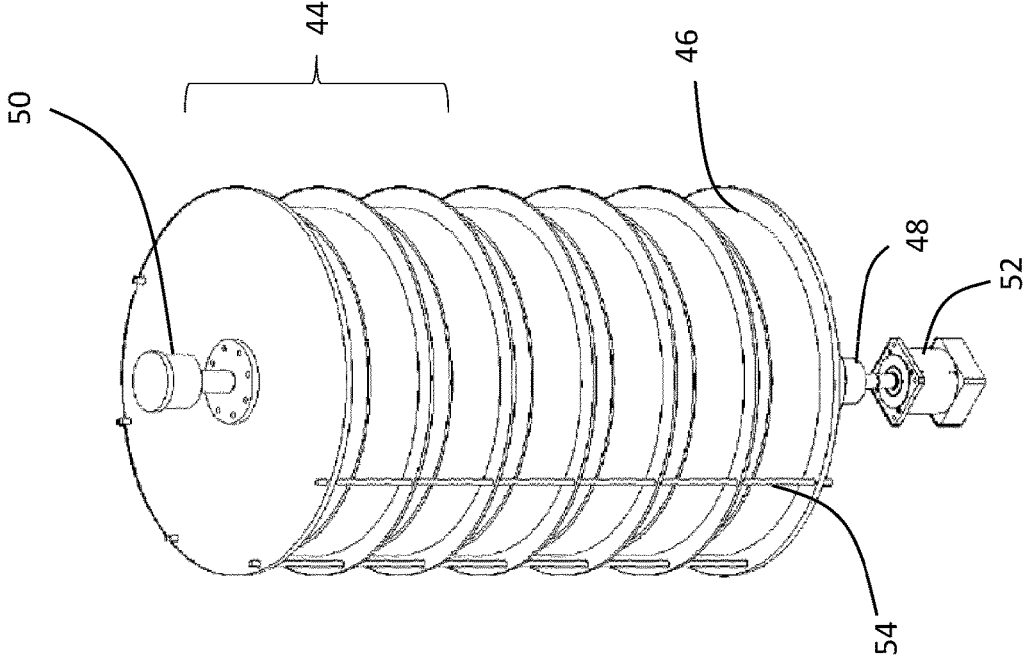
FIG. 6 is a top perspective view of the rotating tray assembly of the dehydrating apparatus.

As shown in FIGS. 4 and 6, the dehydrating chamber 14 contains a rotating tray assembly 44 comprising multiple vertically-spaced trays 46 each for carrying food or other biomass product (not shown). Each tray includes an outer wall to keep the biomass inside the tray. The trays can be composed of a food-grade high density polyethylene (HDPE) material. Each tray 46 has an axial opening (not shown), and a central drive axle 48 extends through the axial openings and is coupled to each tray 46. The top end of the axle 48 is secured by a hub 50 mounted to the top wall 34(a), and the bottom end of the axle is mounted to a drive motor 52 mounted underneath the bottom wall 34(b) and which can be controlled by the controller 24 to rotate the axle 48 and the trays 46. A plurality of vertically-extending tie rods 54 extend around the periphery of the trays 46 to provide stability to the tray assembly 44. In some embodiments, the trays can be separately removable from the dehydrating chamber 14, and in other embodiment the entire tray assembly 44 can be removed.

Referring again to FIGS. 2 and 3, the magnetron assembly 16 comprises a plurality of magnetrons 56 each with an associated waveguide 38. In this embodiment, there are six magnetrons 56 and associated waveguides 38; however, a different number of magnetrons and waveguides can be used depending on the design specifications of the apparatus 10. The magnetron 56 generates microwave energy using the interaction of a stream of electrons with a magnetic field. The magnetron 56 has a power output selected depending on the operational specifications of the apparatus 10; for example, the magnetron 56 can be a commercially available 3 kW water-cooled magnetron. The waveguide 38 is a structure comprising a polished inner surface and which serves to guide electromagnetic waves emitted by an associated magnetron 56 along a transmission pathway to an associated opening 36 in the dehydrating chamber 14. The magnetron assembly 16 further comprises a plurality of power supplies 58 each electrically coupled to an associated magnetron 56 and configured to convert AC power to high voltage DC power. The power supply 58 has a power output selected depending on the operational specifications of the apparatus 10; for example, the power supply 58 can be a commercially available 3000-4000 V unit suitable for powering a 3 kW magnetron. The magnetron assembly 16 is communicative with the controller 24, which controls the operation of the magnetrons 56.

The vacuum assembly 18 comprises a vacuum pump 60, a hose 62 extending between the vacuum pump 60 and air suction port (not shown) at the bottom of the dehydrating chamber 14, and a pneumatic valve 64 on the bottom wall 34(b). The vacuum pump 60 is controlled by the controller 24 and has an operational capacity selected based on the operational specifications of the apparatus 10; for example, the vacuum pump 60 can be a commercially available scroll or rotary vane pump that is operable to reduce the pressure inside the dehydrating chamber to 0.9-1.2 psi. The pneumatic valve 64 can be controlled by the controller 24 to keep the pressure inside the dehydrating chamber 14 within a target pressure range, for example, by opening and closing the valve 64 based on a PID control method. Using the valve 64 to regulate the pressure inside the dehydrating chamber 14 is expected to reduce the on-off cycling frequency of the vacuum pump 60, which should increase the life cycle of the vacuum pump 60.

The infrared heating assembly 20 comprises a plurality of infrared heaters 42 controlled by the controller 24. In this embodiment, there are six infrared heaters 42; however, a different number of infrared heaters 42 can be used depending on the design specifications of the apparatus 10.

For example, the infrared heaters 42 can be a commercially available 100 kW infrared lamp.

The heated air circulation assembly 22 comprises a heating element 70 mounted inside the dehydrating chamber 14 on the bottom wall 34(b) (see FIG. 4), one or more fans 71 mounted inside the dehydrating chamber 14, and heating pads 72 mounted on the surface of the side and back walls 34(c), 34(d). The heating element 70, fans 71 and heating pad(s) 72 are controlled by the controller 24, which operates the heating element 70 to heat the air inside the dehydrating chamber 14, operates the fan to circulate the heated air within the dehydrating chamber 14, and operates the heating pad(s) to heat the dehydrating chamber walls 34(a), (b), (c), (d) to a temperature within a selected range. For example, the heating pad(s) can be operated to heat the walls 34(c), 34(d) to a temperature between 36.7° C. and 41.2° C.

The dehydrating apparatus 14 also includes a pressure sensor 80 and plurality of temperature sensors 82 mounted on the dehydrating chamber top and back walls 43(a), 43(d) respectively. These sensors 80, 82 are communicative with the controller 24 and operable to measure the temperature and pressure inside the dehydrating chamber 14. Commercially available pressure and temperature sensors can be used, such as an absolute pressure sensor and an infrared contactless temperature sensor. More particularly, infrared contactless sensors can be used to measure the outer temperature of the biomass product, temperature probes can be placed inside a tray to measure the inner temperature of the biomass product, and PT100 sensors can be used to measure the air and surface temperature inside the dehydration chamber 14.

Figure 7:
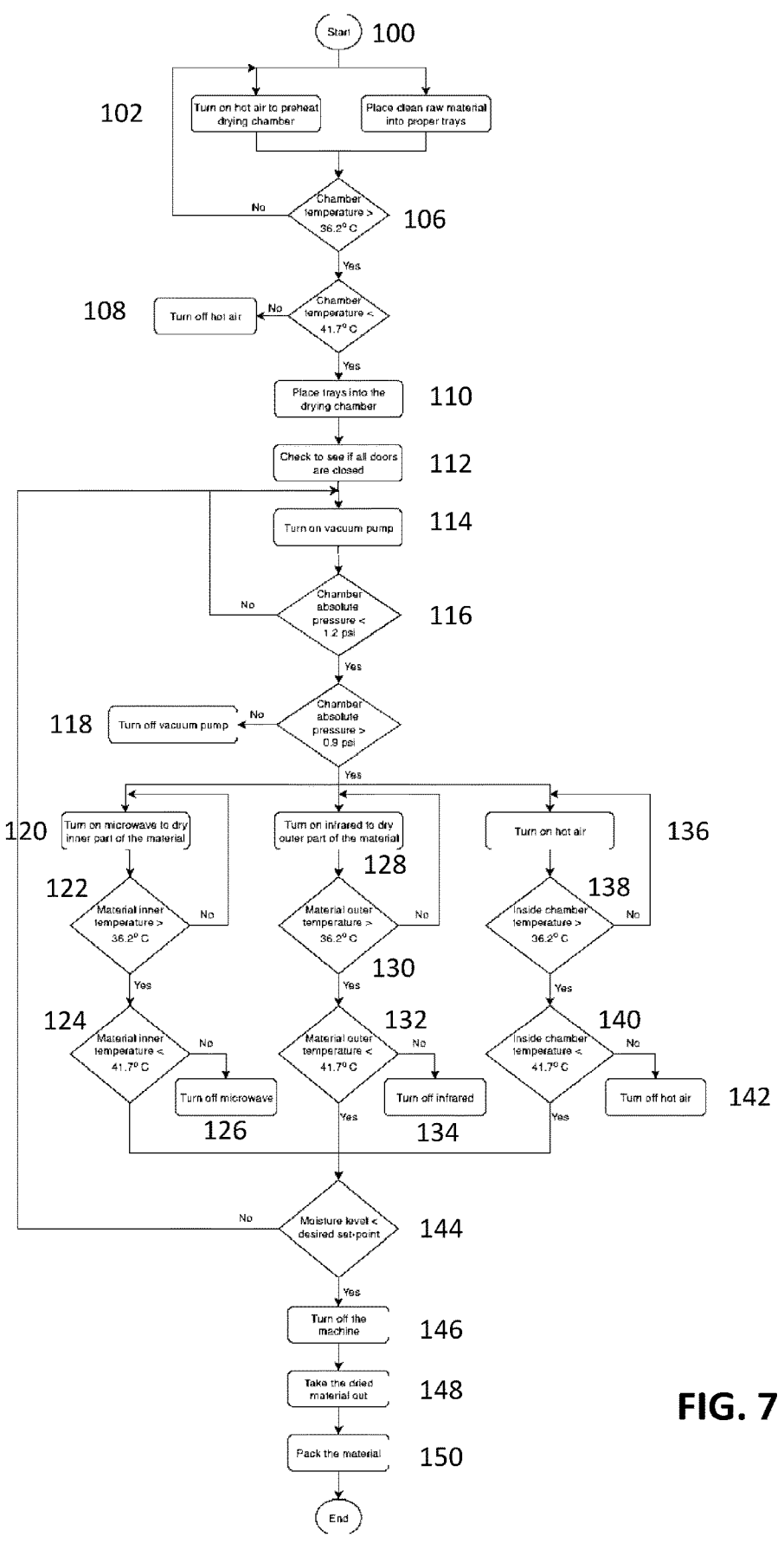
FIG. 7 is a flow chart of a method of operating the dehydrating apparatus to dehydrate a biomass product.

Referring now to FIG. 7, the controller 24 is a programmable logic controller (PLC) and has a processor and a memory having stored thereon a control program for operating the dehydrating apparatus 10 to perform a biomass dehydration operation. As noted above, the controller 24 is communicative with the magnetron assembly 16, the vacuum assembly 18, the infrared heating assembly 20, and the heated air circulation assembly 22, and can operate components of those assemblies 16, 18, 20, 22 to carry out the biomass dehydration operation, as described below:

The operation starts with preheating the dehydrating chamber (step 100) wherein the controller 24 turns on the heating element 70, fan 71, and heating pad 72 (step 102). The controller 24 periodically checks the temperature sensors 82 and continues the preheating step when the measured temperature is below a lower temperature threshold (step 106), for example below 36.2° C., and stops the preheating step (step 102) when the measured temperature is above an upper temperature threshold (step 108), for example, above 41.7° C.

Once the preheating has been completed, the operator can place the trays 46 loaded with wet biomass material to be dehydrated into the dehydrating chamber (step 110). The access door 30 is closed (step 112), and the operator can use the user interface 32 to instruct the controller 24 to initiate a dehydrating operation. The controller 24 can be loaded or preloaded with a dehydrating recipe for the wet biomass material that sets the required power levels for each of the magnetron assembly 16, infrared heating assembly 20 and heated air circulation assembly 22 to evenly dehydrate the interior and exterior portions of the biomass product. If such a recipe is not available for the biomass product, then an initial dehydration operation can be performed to determine the required power levels and create a recipe.

In this operation, the controller 24 turns on the vacuum pump 60 (step 114), checks the pressure sensor 80 and continues operating the vacuum pump 60 when the measured pressure is above an upper pressure threshold (step 116), for example, 1.2 psi. The controller 24 turns off the vacuum pump 60 when the measured pressure is below a lower pressure threshold (step 118), for example, 0.9 psi. In this manner, the pressure inside the dehydrating chamber 14 is kept within a target pressure range, e.g. between 0.9-1.2 psi. The controller continues to check the pressure sensor 80 and will turn the vacuum pump 60 back on if the measured pressure rises above the upper pressure threshold.

Once the measured pressure is within the target pressure range, the controller 24 simultaneously operates the magnetron assembly 16, infrared heating assembly 20 and heated air circulation assembly 22 to dry the wet biomass product and remove moisture inside the dehydrating chamber 14. If a recipe is available, then the controller 24 sets the power levels for each of the assemblies 16, 20, 22 at the specified power levels; if no recipe is available, then the operator can set initial power levels for each of the assemblies 16, 20, 22, which can be adjusted later if the biomass product is not evenly dehydrated. The controller 24 then turns on the magnetrons 56 (step 120), checks the temperature sensors 82, and continues to operate the magnetrons 56 when the temperature of the interior portion of the biomass material is below a lower temperature threshold, e.g. below 36.2° C. (step 122). The controller 24 turns off the magnetrons 56 (step 126) when the measured temperature is above an upper temperature threshold, e.g. above 41.7° (step 124).

The controller 24 operates the infrared heating assembly 20 by turning on the infrared heaters 42 (step 128) and checking the temperature sensors 82, and continues to operate the infrared heaters 42 when the temperature of the outer portion of the biomass material is below a lower temperature threshold, e.g. below 36.2° C. (step 130), and turns off the infrared heaters 42 (134) when the measured temperature is above an upper temperature threshold, e.g. above 41.7° (step 132).

The controller 24 operates the heated air circulation assembly 20 by turning on the heating element 70, heating pads, and fan (step 136) and checking the temperature sensors 82, and continues to operate the heating element, heating pads and fan when the air temperature inside the dehydrating chamber is below a lower temperature threshold, e.g. below 36.2° C. (step 138), and turns off the heating element, heating pads and fan (step 142) when the measured temperature is above an upper temperature threshold, e.g. above 41.7° (step 140).

While the magnetron assembly 16, infrared heating assembly 20 and heated air circulation assembly 22 are operating, the controller 24 checks the moisture level and continues operation of these assemblies 16, 20, and 22 when the measured moisture level is below a target set-point (step 144), and stops operation when the measured moisture level is above the target set-point (step 146). The dehydrating operation is completed and the operator can then remove the dehydrated biomass material from the apparatus 10 (step 148) for packing (step 150).

When performing an initial dehydration operation of a biomass product without a dehydration recipe, the controller can stop the dehydration operation, and the user can measure the moisture levels of the interior and exterior portions of the biomass product. If the measured moisture levels indicate that the biomass product is being dehydrated unevenly, the operator can adjust the power settings for one or more of the magnetron assembly 16, infrared heating assembly 20, and heated air circulation assembly 22 with the goal of more evenly dehydrating the biomass product. This moisture measurement and power setting adjustment can be repeated with one or more biomass products until the dehydration operation evenly dehydrates the biomass product, and a recipe can be created for this biomass product.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

It is contemplated that any part of any aspect or embodiment discussed in this specification can be implemented or combined with any part of any other aspect or embodiment discussed in this specification.

The scope of the claims should not be limited by the preferred embodiments set forth in the examples, but should be given the broadest interpretation consistent with the description as a whole.

What is claimed is:

1. A biomass dehydrating apparatus comprising:
   (a) a dehydrating chamber for containing a biomass product to be dehydrated;
   (b) a magnetron assembly electromagnetically coupled to the dehydrating chamber and operable to transmit microwave energy into the dehydrating chamber;
   (c) a vacuum assembly fluidly coupled to the dehydrating chamber and operable to reduce an air pressure within the dehydrating chamber;
   (d) an infrared heating assembly thermally coupled to the dehydrating chamber and operable to radiate infrared energy into the dehydrating chamber;
   (e) a heated air circulation assembly fluidly coupled to the dehydrating chamber and operable to circulate heated air within the dehydrating chamber; and
   (f) a controller communicative with and programmed to operate the magnetron assembly, vacuum assembly, infrared heating assembly and heated air circulation assembly to reduce pressure, then simultaneously transmit microwave energy, radiate infrared energy, and circulate heated air inside the dehydrating chamber, wherein a power of each of the magnetron assembly, infrared heating assembly, and heated air circulation assembly is selected so that interior and exterior portions of the biomass product are simultaneously dehydrated.

2. The apparatus as claimed in claim 1 further comprising a rotatable tray assembly inside the dehydrating chamber for rotatably supporting the biomass product.

3. The apparatus as claimed in claim 2 wherein the rotatable tray assembly comprises multiple vertically spaced plates, an axle connected to each plate, and a motor rotatably coupled to the axle such that the multiple plates can be rotated.

4. The apparatus as claimed in claim 1 wherein the heated air circulation assembly comprises at least one heating element inside the dehydrating chamber, at least one heating pad contacting a wall of the dehydrating chamber, and at least one fan inside the dehydrating chamber, and wherein the controller is programmed to operate the at least one heating pad to maintain the wall at a selected temperature range, and to operate the heating element and fan to heat and circulate air within the dehydrating chamber.

5. The apparatus as claimed in claim 4 wherein the controller is programmed to operate the at least one heating pad to maintain temperature of the dehydrating chamber wall between 36.7° C. and 41.2° C.

6. The apparatus as claimed in claim 1 wherein the vacuum assembly comprises a vacuum pump, and the controller is programmed to operate the vacuum pump to reduce the pressure inside the dehydrating chamber to 0.9-1.2 psi (6.2-8.3 kPa).

7. The apparatus as claimed in claim 6 wherein the vacuum assembly comprises a pneumatic valve, and the controller is programmed to operate the pneumatic valve to keep the pressure of the dehydrating chamber at a target set-point pressure.

8. The apparatus as claimed in claim 1 wherein the dehydrating chamber comprises openings communicative with the magnetron assembly and infrared heating assembly such that microwave and infrared energy can pass into the dehydrating chamber.

9. The apparatus as claimed in claim 8 wherein the magnetron assembly comprises at least one magnetron and an associated waveguide extending between the at least one magnetron and one of the openings in the dehydrating chamber.

10. The apparatus as claimed in claim 1 further comprising temperature and pressure sensors coupled to the dehydrating chamber and communicative with the controller.

11. The apparatus as claimed in claim 1 further comprising a user control interface communicative with the controller and operable to manually control operation of one or more of the magnetron assembly, vacuum assembly, infrared heating assembly, and heated air circulation assembly.

\* \* \* \* \*